H. C. BENEFIEL.
POULTRY FEEDING AND WATERING DEVICE.
APPLICATION FILED JAN. 30, 1908.
905,278.
Patented Dec. 1, 1908.
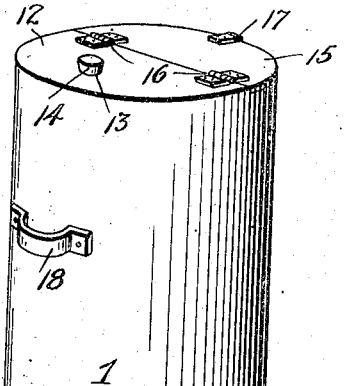
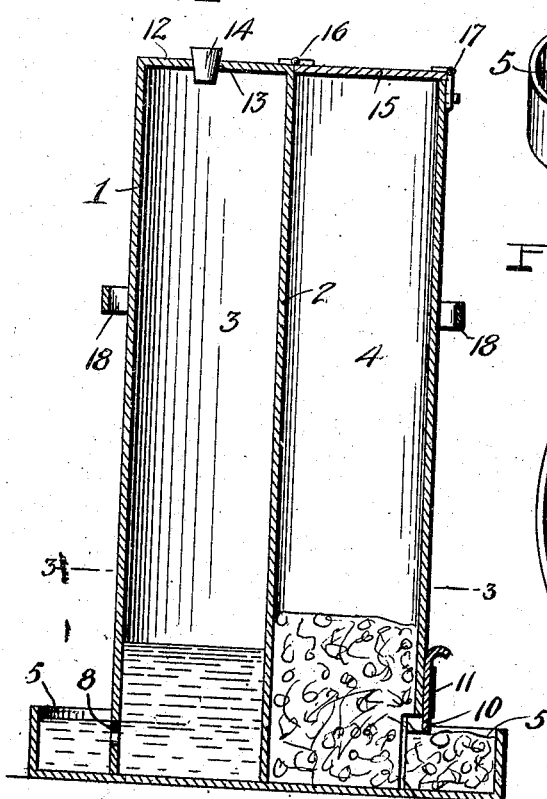
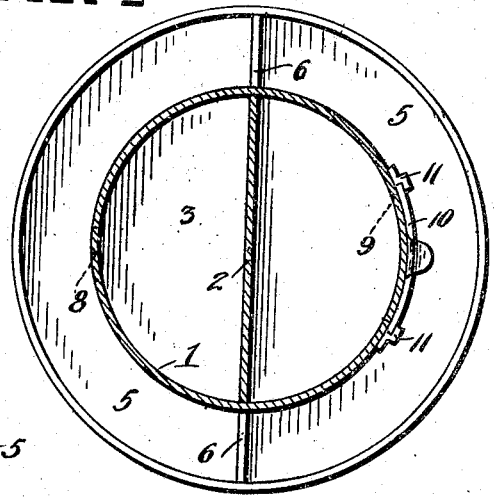
Witnesses
Chas. L. Griestauer.
L. O. Little.
Inventor
Harriet C. Benefiel
By Watson E. Coleman
Attorney

UNITED STATES PATENT OFFICE.

HARRIET CATHRINE BENEFIEL, OF VANDALIA, ILLINOIS.

POULTRY FEEDING AND WATERING DEVICE.

No. 905,278.  Specification of Letters Patent.  Patented Dec. 1, 1908.

Application filed January 30, 1908. Serial No. 413,483.

*To all whom it may concern:*

Be it known that I, HARRIET CATHRINE BENEFIEL, a citizen of the United States, residing at Vandalia, in the county of Fayette and State of Illinois, have invented certain new and useful Improvements in Poultry Feeding and Watering Devices, of which the following is a specification, reference being had to the accompanying drawings.

My invention relates to improvements in devices for feeding and watering poultry, and it consists of the novel construction and the combination and arrangement of parts hereinafter described and claimed.

The object of the invention is to provide a combined feeding and watering device of this character which will be simple, strong, durable and comparatively inexpensive in construction, which may be conveniently moved from place to place and easily refilled and from which the grain and water will feed as they are consumed by the poultry.

The above and other objects are attained in the construction illustrated in the accompanying drawings, in which—

Figure 1 is a perspective view of my improved combination feeding and watering device; Fig. 2 is a vertical sectional view; and Fig. 3 is a horizontal section taken on the line 3—3 in Fig. 2.

In the drawings 1 denotes the body of my improved feeding and watering device which is preferably in the form of a cylinder provided with a central vertical partition 2 which divides it into two compartments or chambers 3, 4, the former of which is for water and the latter for grain or other poultry feed. Surrounding the bottom of the cylindrical body 1 is an annular trough 5 containing vertical partitions 6 arranged at diametrically opposite points and in the vertical plane of the partition 2 so as to provide two semi-circular trough sections, one for the water which feeds into the same through an opening 8 arranged adjacent to the bottom of the body, and the other for poultry feed which passes out of the compartments 4 through a slot or opening 9 formed in the body 1 at its flat bottom. The discharge opening 9 is provided with a controlling gate or cover 10 arranged for vertical sliding movement in guides 11 as shown in Fig. 3. The top of the water compartment 3 is closed by a semi-circular plate or cover 12 which is secured so that the upper portion of said compartment is air tight. In the cover or top 12 is an opening 13 through which water is introduced into said compartment 3 and which is adapted to be closed by a removable plug or stopper 14. When it is desired to fill the compartment 3 with water, the stopper 14 may be inserted in the discharge opening 8 and water is then poured into the filling opening 13. When the compartment is full, the stopper 14 is placed in the opening 13 to render the upper portion of the compartment 3 air tight so that the water will feed gradually from the same and be maintained at a constant level in the trough. The top of the feed compartment 14 is closed by a semi-circular cover 15 which is hinged at 16 and provided with a suitable fastener 17. I preferably provide hand loops 18 at opposite points upon the body 1 so that the device may be conveniently carried.

From the foregoing description taken in connection with the accompanying drawings it is thought that the construction, use, and advantages of the invention will be readily understood without a more extended explanation.

Having thus described my invention what I claim is:

A combined poultry feeding and watering device comprising a cylindrical body having a central vertical partition dividing it into water and feed compartments, said water compartment having a discharge opening adjacent to its bottom, a top plate to close the top of the water compartment and formed with a filling opening, a removable plug in the latter, said feed compartment having a discharge opening at its bottom, guides adjacent to said opening, a slide arranged in said guides, a hinged cover for the open top of the feed compartment, an annular trough surrounding the bottom of the body, partitions arranged in said trough at opposite points and in the vertical plane of the partition in the body, and handles arranged upon the body at opposite points, substantially as described.

In testimony whereof I hereunto affix my signature in the presence of two witnesses.

HARRIET CATHRINE BENEFIEL.

Witnesses:
J. G. BURNSIDE,
ELLA S. HOAR.